United States Patent
Maeda

(10) Patent No.: US 9,417,771 B2
(45) Date of Patent: Aug. 16, 2016

(54) INFORMATION PROCESSING APPARATUS, INFORMATION PROCESSING METHOD, AND COMPUTER READABLE-RECORDING MEDIUM

(71) Applicant: Shunichi Maeda, Tokyo (JP)

(72) Inventor: Shunichi Maeda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 184 days.

(21) Appl. No.: 14/276,246

(22) Filed: May 13, 2014

(65) Prior Publication Data

US 2015/0331592 A1 Nov. 19, 2015

(30) Foreign Application Priority Data

May 16, 2013 (JP) .................................. 2013-104530

(51) Int. Cl.
*G06F 3/048* (2013.01)
*G06F 3/0484* (2013.01)
*G06F 3/0488* (2013.01)

(52) U.S. Cl.
CPC ............ *G06F 3/0484* (2013.01); *G06F 3/0488* (2013.01); *G06F 3/04842* (2013.01); *G06F 3/04845* (2013.01); *G06F 3/04847* (2013.01)

(58) Field of Classification Search
CPC .................................................... G06F 3/0488
USPC .......................................................... 715/781
See application file for complete search history.

(56) References Cited

U.S. PATENT DOCUMENTS

| | | | | |
|---|---|---|---|---|
| 2011/0050566 A1* | 3/2011 | Sawai | ...................... | G06F 3/033 345/157 |
| 2013/0147834 A1* | 6/2013 | Yoshimoto | ........... | G01C 21/367 345/629 |
| 2014/0049499 A1* | 2/2014 | Huck | .................... | G06F 3/0416 345/173 |
| 2014/0111551 A1* | 4/2014 | Suzuki | .................... | G06F 3/048 345/661 |

FOREIGN PATENT DOCUMENTS

| | | |
|---|---|---|
| JP | 2003-248551 | 9/2003 |
| JP | 4542637 | 7/2010 |
| JP | 2011-141340 | 7/2011 |

* cited by examiner

*Primary Examiner* — William Titcomb
(74) *Attorney, Agent, or Firm* — Oblon, McClelland, Maier & Neustadt, L.L.P.

(57) ABSTRACT

An information processing apparatus comprises an operating module to which a touch operation performed with a pointing tool is entered; a calculating module that calculates a reference distance that is a distance between a reference point on an image display area of an operation display surface and a point on the image display area defined by a first operation performed on the operating module with a single piece of the pointing tool, calculates a control distance that is a distance between the reference point and a point on the image display area defined by a second operation performed on the operating module with a single piece of the pointing tool, and calculates a magnification ratio based on the reference distance and the control distance; and a magnification/reduction module that generates a scaled image by magnifying or reducing a display image displayed on the image display area by the magnification ratio.

10 Claims, 12 Drawing Sheets

INFORMATION PROCESSING APPARATUS, INFORMATION PROCESSING METHOD, AND COMPUTER READABLE-RECORDING MEDIUM

CROSS-REFERENCE TO RELATED APPLICATION

The present application claims priority to and incorporates by reference the entire contents of Japanese Patent Application No. 2013-104530 filed in Japan on May 16, 2013.

BACKGROUND OF THE INVENTION

1. Field of the Invention

The present invention relates to an information processing apparatus, an information processing method, and a computer-readable recording medium.

2. Description of the Related Art

Of information processing apparatuses including a touch panel, the information processing apparatuses that perform magnification or reduction of a display image by a user performing a given operation to the touch panel are already known. Such a display of the display image in a magnified or reduced manner is one of the most basic functions of the information processing apparatus that displays images. In particular, the operation to magnify a display image is an operation of a high use frequency as it can be said to be the operation almost always performed in a case when the user wants to grasp a specific portion of the display image by magnifying it. When the user operates to display a display image in a magnified or reduced manner, it is thus important to improve its operability.

As an information processing apparatus that displays a display image in such a magnified or reduced manner, disclosed is a hand-held terminal of improved usability by permitting the operation of rotation, magnification, reduction, scrolling, and others to be performed on a display image such as a map image (see Japanese Patent No. 4542637). The hand-held terminal determines that a magnifying operation is received when the action performed on a touch panel is to move two fingers away from each other (what is called pinch-out), and determines that a reducing operation is received when the action performed is to bring two fingers closer together (what is called pinch-in).

Furthermore, as an information processing apparatus that displays a display image in a magnified or reduced manner, disclosed is a map display device that permits the display in a magnified manner to be made reliably and rapidly by performing a double-tapping operation on any point on a map to improve its operability (see Japanese Patent Application Laid-open No. 2011-141340).

While the hand-held terminal disclosed in Japanese Patent No. 4542637 can display a display image in a magnified or reduced manner by a pinch-out or pinch-in operation, respectively, it is necessary to touch a plurality of places on the touch panel at the same time. Consequently, there is a drawback in that a touch panel not capable of detecting touch operations made on a plurality of places cannot be employed. Furthermore, there is a drawback in that, when the hand-held terminal is operated with one hand, it is difficult to perform the above-described pinch-out and pinch-in operations.

Meanwhile, the map display device disclosed in Japanese Patent Application Laid-open No. 2011-141340 has a drawback in that, because the display magnified by only a predetermined magnification ratio is provided in the magnified display of display image by double-tapping operation, a display magnified by a magnification ratio the user desires is not permitted.

In view of the above-described situations, there is a need to provide an information processing apparatus, an information processing method, and a computer program product that improve operability in magnifying and reducing a display image.

SUMMARY OF THE INVENTION

It is an object of the present invention to at least partially solve the problems in the conventional technology.

According to the present invention, there is provided an information processing apparatus comprising: an operating module to which a touch operation performed with a pointing tool is entered; a calculating module that calculates a reference distance that is a distance between a reference point on an image display area of an operation display surface and a point on the image display area defined by a first operation performed on the operating module with the pointing tool, calculates a control distance that is a distance between the reference point and a point on the image display area defined by a second operation performed on the operating module with the pointing tool, and calculates a magnification ratio based on the reference distance and the control distance; and a magnification/reduction module that generates a scaled image by magnifying or reducing a display image displayed on the image display area by the magnification ratio.

The present invention also provides an information processing method comprising: determining a reference point on an image display area of an operation display surface; calculating a reference distance that is a distance between the reference point and a point on the image display area defined by a first operation performed on an operating module to which a touch operation performed with a pointing tool is entered with the pointing tool; calculating a control distance that is a distance between the reference point and a point on the image display area defined by a second operation performed with a single piece of the pointing tool; calculating a magnification ratio based on the reference distance and the control distance; and displaying a scaled image that is a display image displayed on the image display area magnified or reduced by the magnification ratio.

The present invention also provides a non-transitory computer-readable recording medium that contains a computer program that causes a computer to function as: a reference-point determining module that determines a reference point on an image display area of an operation display surface; a calculating module that calculates a reference distance that is a distance between the reference point and a point on the image display area defined by a first operation performed on an operating module to which a touch operation performed with a pointing tool is entered with a single piece of the pointing tool, calculates a control distance that is a distance between the reference point and a point on the image display area defined by a second operation performed with a single piece of the pointing tool, and calculates a magnification ratio based on the reference distance and the control distance; and a magnification/reduction module that displays a scaled image that is a display image displayed on the image display area magnified or reduced by the magnification ratio.

The above and other objects, features, advantages and technical and industrial significance of this invention will be better understood by reading the following detailed descrip-

DETAILED DESCRIPTION OF THE PREFERRED EMBODIMENTS

With reference to the accompanying drawings, the following describes in detail exemplary embodiments of an information processing apparatus, an information processing method, and a computer program product according to the present invention. As the information processing apparatus in the invention, a multifunction peripheral (MFP) will be exemplified. The MFP means an image forming apparatus that has at least two functions out of print function, copying function, scanner function, and facsimile function. The information processing apparatus in the invention, however, is not limited to an MFP, and it only needs to be an information processing apparatus, for example, an image forming apparatus such as a printing machine, a copying machine, a scanner device, and a facsimile device; a projector; a personal computer; or a handheld terminal.

The invention is not intended to be limited by the following embodiments, and the constituent elements in the embodiments include those that are easily conceivable by a person skilled in the art, those of practically the same, and those of what is called the equivalents thereof. Furthermore, various omissions, substitutions, and changes of the constituent elements can be made without departing from the spirit of the following embodiments.

First Embodiment

Overall Configuration of MFP

Figure 1:
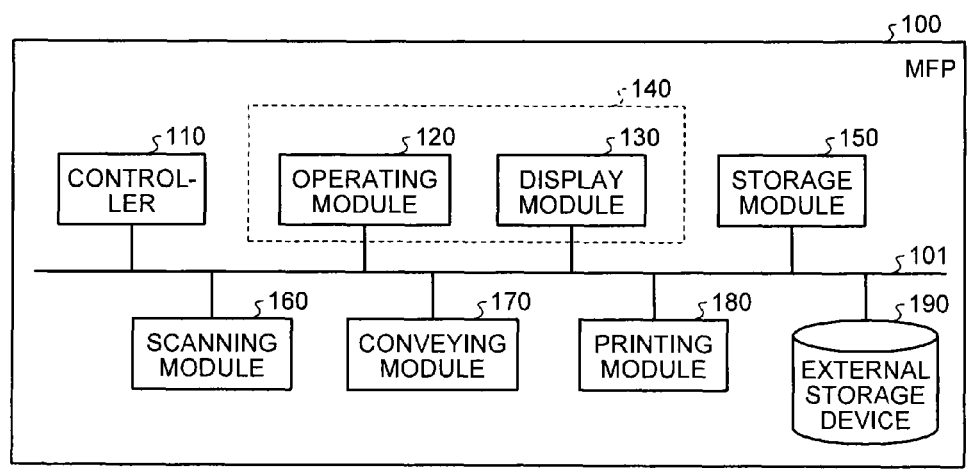
FIG. 1 is a block diagram illustrating an example of the configuration of a multifunction peripheral according to a first embodiment.
Figure 2:
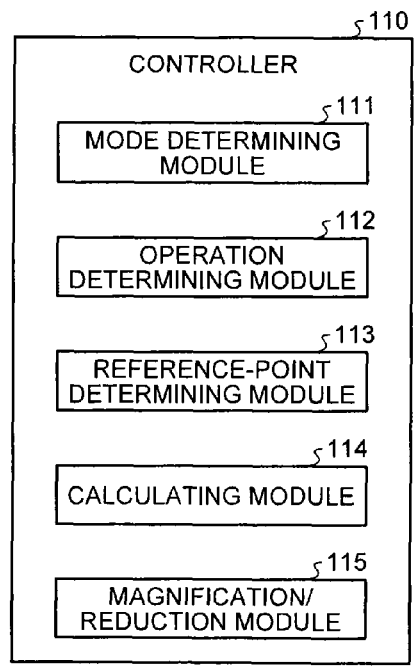
FIG. 2 is a block diagram illustrating an example of the configuration of a controller of the multifunction peripheral in the first embodiment.

FIG. 1 is a block diagram illustrating an example of the configuration of an MFP according to a first embodiment. FIG. 2 is a block diagram illustrating an example of the configuration of a controller of the MFP in the first embodiment. With reference to FIGS. 1 and 2, the overall configuration of an MFP 100 in the first embodiment will be described.

As illustrated in FIG. 1, the MFP 100 in the first embodiment includes a controller 110, an operation display module 140, a storage module 150, a scanning module 160, a conveying module 170, a printing module 180, and an external storage device 190. The foregoing various modules are connected via a bus 101, and are able to send and receive data with one another.

The controller 110 is a device that controls the behavior of the various modules in the MFP 100. The controller 110 is implemented, for example, by a central processing unit (CPU) and an application specific integrated circuit (ASIC).

The operation display module 140 includes an operating module 120 and a display module 130. The operation display module 140 is implemented, for example, by a touch panel that receives operation entered by a user and displays various screens. On the operating module 120, the user performs the entries of starting operation, setting operation, and others for printing, copying, scanning, facsimileing, and the like. The operating module 120 is implemented, for example, by an operation entry function of the touch panel. The operating module 120 may include input devices such as key switches in addition to having the operation entry function of the touch panel. The display module 130 displays various screens such as a menu screen for device setting and others, and status display screens for printing, copying, scanning, facsimileing, and others. The display module 130 is implemented, for example, by a liquid crystal display of the touch panel.

Furthermore, when the information processing apparatus in the first embodiment is a personal computer, the operating module 120 may be implemented by a touch pad, for example. The display module 130 is then implemented, for example, by a cathode ray tube (CRT) display or a liquid crystal display.

The storage module 150 is a device that stores therein various computer programs executed by the MFP 100, and data and others used for a variety of processes performed by the MFP 100. The storage module 150 is implemented, for example, by a storage device such as a read only memory (ROM) and a random access memory (RAM).

The scanning module 160 optically scans an image of a document and generates image information. The scanning module 160 is implemented, for example, by an image reading device such as a scanner constituted by a light source, an image sensor, and others.

The conveying module 170 conveys recording sheets, on which an image based on the image information generated by the scanning module 160 and an image based on the image information received by a communication device (not depicted) are printed (transferred), inside the MFP 100. The conveying module 170 is implemented, for example, by a conveying device that includes motors, rollers, sensors, and conveying belts.

The printing module 180 prints (transfers) an image based on the image information generated by the scanning module 160 and an image based on the image information received by the communication device (not depicted) on a recording sheet conveyed by the conveying module 170. The printing module 180 is implemented, for example, by a printing device that includes charging devices, photosensitive drums, exposure devices, developing devices, transferring devices, and a fixing device.

The external storage device 190 is a storage device that accumulates and stores therein image information, computer programs, font data, and others. The external storage device 190 is implemented, for example, by a storage device such as a hard disk drive (HDD), a solid state drive (SSD), an optical disc, or a magneto-optical disk (MO).

As illustrated in FIG. 2, the controller 110 includes a mode determining module 111, an operation determining module 112, a reference-point determining module 113, a calculating module 114, and a magnification/reduction module 115.

The mode determining module 111 determines whether a mode is in a normal mode or a magnification/reduction mode. The normal mode is a mode in which the user performs the entries of starting operation, setting operation, and others for printing, copying, scanning, facsimileing, and the like from the operating module 120. The magnification/reduction mode, while its details are described later, is an operating mode in which a display image displayed on the display module 130 of the operation display module 140 can be magnified or reduced by the user operation performed on the operating module 120.

The operation determining module 112 determines the type of user operation. The operation determining module 112 receives operating information generated by the user operation performed on the operating module 120, and based on the operating information, determines whether the user operation is a depression operation, a depression-release operation, a long-press operation, or a double-tapping operation, for example.

The reference-point determining module 113 determines a position on the display screen to be a reference (reference point S) to calculate a reference distance L1, a control distance L2, and a magnification ratio M in response to the position of a later described depression point P1 in the magnification/reduction mode. The reference distance L1, as described later, is the distance to be a reference to display a display image displayed on an operation display surface 131 in a magnified or reduced manner. The control distance L2 is the distance between the reference point S and a later described depression point P2. The magnification ratio M is the magnification ratio calculated by a later described Expression 1 based on the reference distance L1 and the control distance L2.

The calculating module 114 calculates the reference distance L1, the control distance L2, and the magnification ratio M based on the reference point S determined by the reference-point determining module 113 and the depression points performed on the display screen by the user.

The magnification/reduction module 115 performs a process of magnifying or reducing an image displayed on the display screen based on the magnification ratio M calculated by the calculating module 114, and displays the image, on which the process of magnifying or reducing has been performed, on the display screen.

The foregoing various processing modules included in the controller 110 do not need to be clearly sectioned from one another, but only need to be implemented in a comprehensive manner by software such as a computer program processed by the controller 110 or by hardware such as an electronic circuit.

Behavior in Changing into Magnification/Reduction Mode

Figure 3:
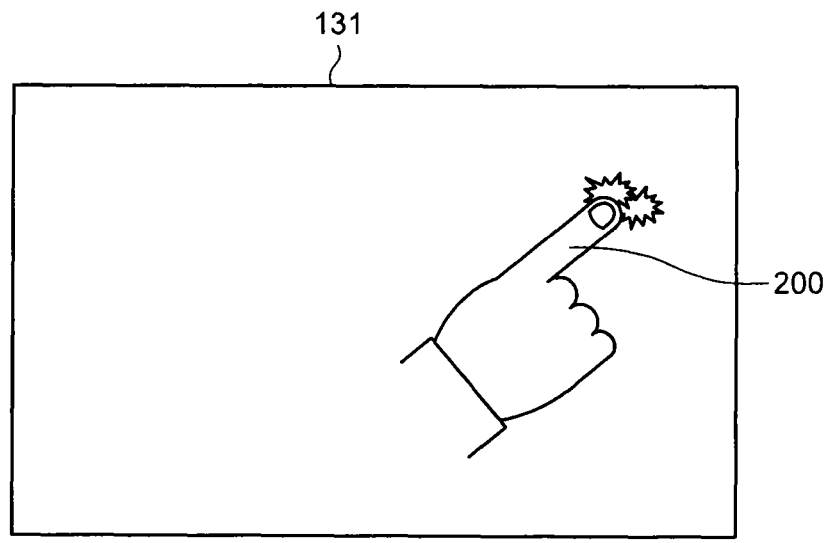
FIG. 3 is a diagram for explaining an example of an operation to change into a magnification/reduction mode performed on a display screen in the first embodiment.

FIG. 3 is a diagram for explaining an example of an operation to change into the magnification/reduction mode performed on the display screen in the first embodiment. With reference to FIGS. 1 to 3, the operation to change into the magnification/reduction mode performed on the operation display surface 131 will be described.

The operation display surface 131 in a rectangular shape illustrated in FIG. 3 is the surface of the touch panel that is the display screen of the display module 130 in the operation display module 140 on which an image is displayed, and is also an operating screen of the operating module 120 in the operation display module 140 to which a touch operation is entered. As illustrated in FIG. 3, the user performs a double-tapping operation on the operation display surface 131 with a finger 200 of the user that is one of pointing tools for the operation display surface 131, and at the second tap, performs a long-press operation. A double-tapping operation is an operation to tap twice successively. A long-press operation is an operation to hold a state of depression for a given period of time (e.g., about 2 seconds), for example. The operating module 120 sends the operating information representing the double-tapping operation and the long-press operation to the controller 110. The operation determining module 112 included in the controller 110 determines that the content of operation the operating information represents is the double-tapping operation and the long-press operation. When the operation determining module 112 determines that the user performed the double-tapping operation and the long-press operation, the controller 110 then changes the mode from the normal mode to the magnification/reduction mode.

While the controller 110 changes the mode from the normal mode to the magnification/reduction mode when the user performs a double-tapping operation and a long-press operation on the operation display surface 131 as in the foregoing, it is not limited to this. More specifically, the controller 110 may change the mode to the magnification/reduction mode by an operation different from the above-described operation (for example, simply a double-tapping operation or a long-press operation).

Furthermore, while the user is to perform a touch operation on the operation display surface 131 with the finger 200, it is not limited to this, and the user may perform the operation with a pointing tool such as a stylus.

Figure 4:
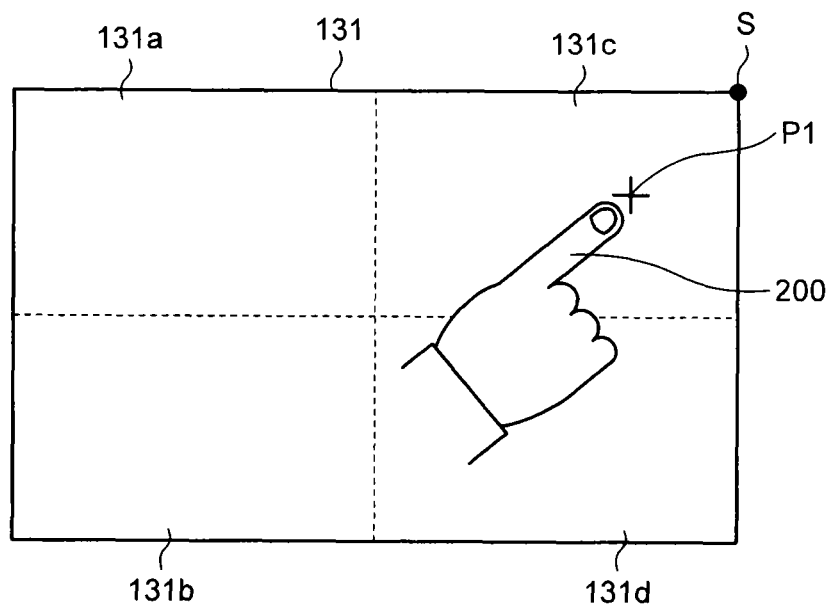
FIG. 4 is a diagram for explaining an example of the behavior in determining a reference point on the display screen in the first embodiment.
Figure 5:
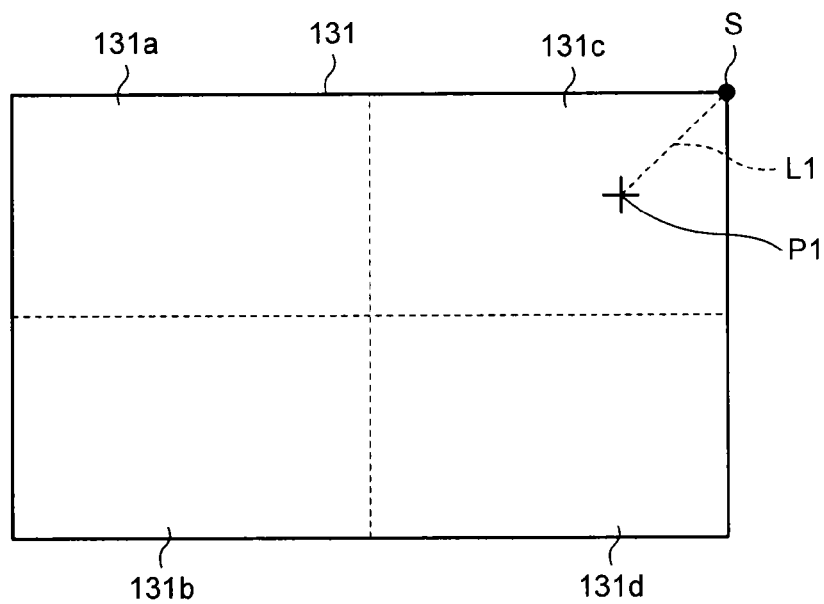
FIG. 5 is a diagram for explaining an example of the behavior in calculating a reference distance on the display screen in the first embodiment.
Figure 6:
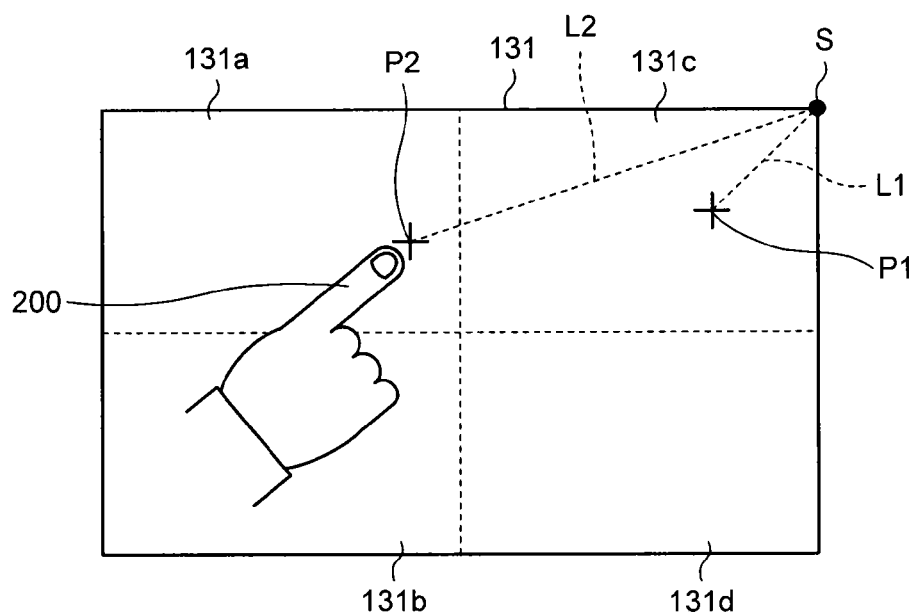
FIG. 6 is a diagram for explaining an example of the behavior in calculating a magnification ratio of a display image on the display screen in the first embodiment.

Behavior in Calculating Reference Point, Reference Distance, and Magnification Ratio FIG. 4 is a diagram for explaining an example of the behavior in determining a reference point on the display screen in the first embodiment. FIG. 5 is a diagram for explaining an example of the behavior in calculating a reference distance on the display screen in the first embodiment. FIG. 6 is a diagram for explaining an example of the behavior in calculating a magnification ratio of a display image on the display screen in the first embodiment. With reference to FIGS. 1, 2, and 4 to 6, the behavior in calculating the reference point S, the reference distance L1, and the magnification ratio M by the controller 110 will be described.

The operation display surface 131 is assumed to be sectioned, as illustrated in FIG. 4, into four screen areas of the same shape. Of the four display screen areas, the upper left area as FIG. 4 is viewed is defined as a first screen area 131a, the lower left area is defined as a second screen area 131b, the upper right area is defined as a third screen area 131c, and the lower right area is defined as a fourth screen area 131d. The operation determining module 112 included in the controller 110 stores the position last touched when the user performed the double-tapping operation and the long-press operation on the operation display surface 131 as in the foregoing, as the depression point P1 in the storage module 150. The depression last touched may be a breakaway position while the depressed position in the long-press operation is fixed, or may be a breakaway position after sliding on the operation display surface 131 while the state of depression in the long-press operation is held.

The reference-point determining module 113 included in the controller 110 determines which area, out of the four display areas of the operation display surface 131, the position of the depression point P1 belongs to. When the reference-point determining module 113 determines that the depression point P1 belongs to the third screen area 131c as illustrated in FIG. 4, for example, the reference-point determining module 113 determines the reference point S to be the upper-right end point of the rectangle-shaped operation display surface 131. In the same manner, when the reference-point determining module 113 determines that the depression point P1 belongs to the first screen area 131a, the second screen area 131b, or the fourth screen area 131d, the reference-point determining module 113 determines the reference point S to be the upper-left end point, the lower-left end point, or the lower-right end point of the operation display surface 131, respectively. More specifically, the reference-point determining module 113 determines, as the reference point S, the point of the shortest distance with respect to the depression point P1 out of the upper-right end point, the upper-left end point, the lower-left end point, and the lower-right end point of the operation display surface 131.

The calculating module 114 included in the controller 110 then calculates the reference distance L1 that is the distance between the reference point S and the depression point P1 as illustrated in FIG. 5, and stores the reference distance L1 in the storage module 150.

Next, the user performs a depression operation at any position on the operation display surface 131 as illustrated in FIG. 6. The operating module 120 sends the operating information representing the depression operation to the controller 110. The operation determining module 112 included in the controller 110 determines that the content of operation the operating information represents is the depression operation performed immediately after the reference distance L1 is calculated by the calculating module 114. The operation determining module 112 then recognizes the position touched by the depression operation as the depression point P2.

The calculating module 114 calculates the control distance L2 that is the distance between the reference point S and the depression point P2. The calculating module 114 then calculates the magnification ratio M by the following Expression (1), and stores the control distance L2 and the magnification ratio M in the storage module 150.

Magnification ratio $M$=Control distance $L2$/Reference distance $L1$     (1)

While the operation determining module 112 recognizes the position on the operation display surface 131 at which the user performed a depression operation as the depression point P1 as in the foregoing, it is not limited to this. More specifically, the operation determining module 112 may recognize, as the depression point P1, the position at which the user performed a depression-release operation (breakaway operation) following a depression operation on the operation display surface 131. This enables the user to decide the depression point P1, once after a depression operation is performed with the finger 200, by freely sliding the finger 200 on the operation display surface 131 while maintaining the state of depression and by performing a depression-release operation at a desired position. Consequently, by the above-described slide operation, the user can adjust the magnification ratio M as desired.

Furthermore, while the calculating module 114 calculates the magnification ratio M by Expression (1), it is not limited to this. The right-hand side of Expression (1) multiplied by a given coefficient may be defined as the magnification ratio M, for example. Consequently, even when the control distance L2 turns out to be too long by a touch operation performed on the operation display surface 131 by the user, for example, defining the magnification ratio M by multiplying the right-hand side of Expression (1) by a coefficient of less than one can reduce the degree of magnification of the display image.

Behavior in Magnifying or Reducing Display Image

Figure 7:
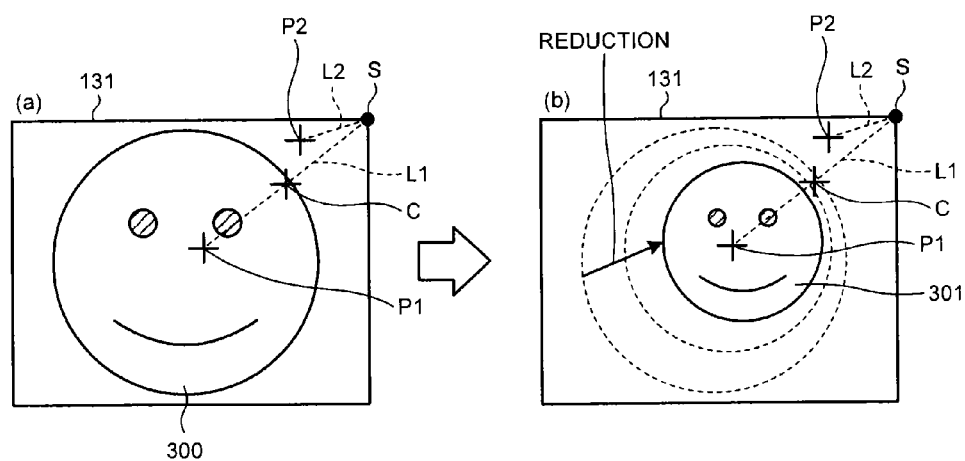
FIGS. 7(a) and 7(b) are diagrams for explaining the behavior in magnifying or reducing a display image on the display screen in the first embodiment.

FIGS. 7(a) and 7(b) are diagrams for explaining the behavior in magnifying or reducing a display image on the display screen in the first embodiment. With reference to FIGS. 1, 2, 7(a), and 7(b), the behavior in magnifying or reducing a display image displayed on the operation display surface 131 will be described.

As illustrated in FIG. 7(a), it is assumed that the calculating module 114 has calculated the reference distance L1 and the control distance L2 in the above-described procedure, and on the operation display surface 131, an original image 300 that is a display image before magnification or reduction is displayed. In the example illustrated in FIG. 7(a), it is assumed as Reference distance L1>Control distance L2. Consequently, the magnification ratio M calculated by the calculating module 114 is a value greater than zero but less than one. The calculating module 114 further calculates the position of a center point C that is the midpoint of a line segment connecting the reference point S and the depression point P1, and stores the position in the storage module 150.

Next, the magnification/reduction module 115 included in the controller 110 generates, from the image information of the original image 300 that is the display image on the operation display surface 131, the image information that is the original image 300 magnified or reduced by the magnification ratio M with the center point C as the center. The magnification ratio M is assumed to be a value greater than zero but less than one as described above, and thus the display image on the operation display surface 131 is reduced. The controller 110 sends the image information generated to the display module 130. The display module 130 displays, as illustrated in FIG. 7(b), a scaled image 301 that is the reduced original image 300 on the operation display surface 131 based on the image information received from the magnification/reduction module 115. Meanwhile, when the magnification ratio M calculated by the calculating module 114 is a value greater than one, the display image on the operation display surface 131 is magnified.

When switching the original image displayed on the operation display surface 131 to a scaled image, the behavior may be to switch from the original image to the scaled image instantaneously, or the behavior may be to switch from the original image to the scaled image eventually as being magnified or reduced in stages.

While the magnification/reduction module 115 generates, from the image information of the original image 300, the image information of the scaled image 301 that is the original image 300 magnified or reduced by the magnification ratio M with the center point C as the center as in the foregoing, it is not limited to this. The magnification/reduction module 115 may generate, from the image information of the original image 300, the image information of the scaled image 301 that is the original image 300 magnified or reduced by the magnification ratio M with the center point of the operation display surface 131 as the center, for example.

Figure 8:
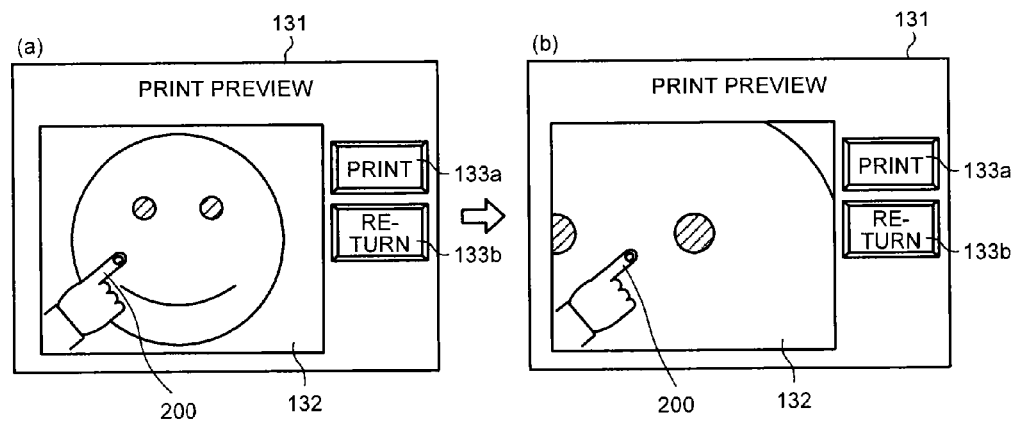
FIGS. 8(a) and 8(b) are diagrams for explaining the behavior in magnifying or reducing a display image in an image display area of the display screen in the first embodiment.

FIGS. 8(a) and 8(b) are diagrams for explaining the behavior in magnifying or reducing a display image in the image display area of the display screen in the first embodiment. As illustrated in FIGS. 8(a) and 8(b), the operation display surface 131 may display the display image, not on the entire screen as illustrated in FIGS. 7(a) and 7(b), but in a rectangular image display area 132 that is a part of the screen. The operation display surface 131 illustrated in FIGS. 8(a) and 8(b) represents examples of a print preview screen, and other than the image display area 132 in which the above-described display image is displayed, a print button 133a and a return button 133b are displayed.

The print button 133a being operated by the depression operation of the user sends the image information of the display image in the image display area 132 to the printing module 180. The printing module 180 prints an image based on the image information received on a recording sheet conveyed by the conveying module 170. The return button 133b, by being operated by the depression operation of the user, has an operating function of returning the magnified or reduced display image to the original image, for example.

In FIGS. 7(a) and 7(b), the entire operation display surface 131 is exemplified as the image display area. In FIGS. 8(a) and 8(b), the behavior in changing into the magnification/reduction mode, the behavior in calculating a reference point, a reference distance, and a magnification ratio, and the behavior in magnifying or reducing a display image in the foregoing are executed by performing the respective operations on the image display area 132. In this case, what displayed in a magnified or reduced manner is only the display image displayed in the image display area 132, and thus the print button 133a and the return button 133b that are soft-keys are not displayed in a magnified or reduced manner. Providing the image display area 132 that displays a display image in a magnified or reduced manner on a part of the operation display surface 131 in this manner permits soft-keys for operations other than the operation to execute the magnifying or reducing behavior to be disposed on the other part. This can improve the operability of the MFP 100.

Behavior of MFP in Magnification/Reduction Mode

Figure 9:
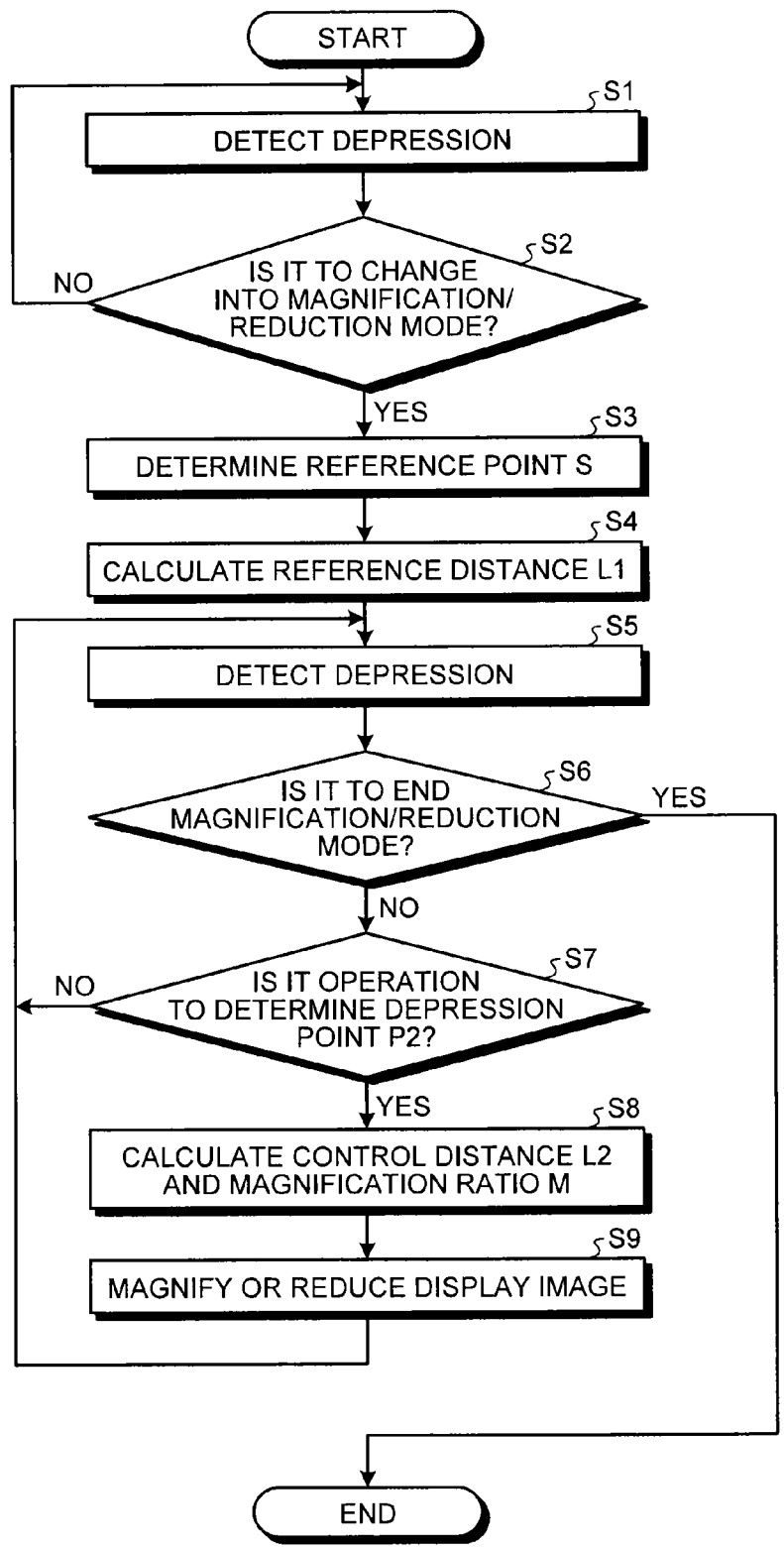
FIG. 9 is a flowchart illustrating an example of the behavior of the multifunctional peripheral in the magnification/reduction mode in the first embodiment.

FIG. 9 is a flowchart illustrating an example of the behavior of the MFP in the magnification/reduction mode in the first embodiment. With reference to FIG. 9, an outline of the behavior of the MFP 100 in the magnification/reduction mode will be described.

Step S1

When the user performs a touch operation on the operation display surface 131, the operating module 120 sends the operating information to the controller 110. The controller 110 detects, by receiving the operating information from the operating module 120, that the operation display surface 131 was depressed by the user. The process is then moved on to Step S2.

Step S2

The operation determining module 112 included in the controller 110 determines whether or not the operation based on the operating information received is the operation to change into the magnification/reduction mode. If the operation is determined to change into the magnification/reduction mode, the controller 110 changes the mode from the normal mode to the magnification/reduction mode. The mode determining module 111 included in the controller 110 then determines whether or not the operating mode is changed to the magnification/reduction mode. If the operating mode is determined to be in the magnification/reduction mode (Yes at Step S2), the process is moved on to Step S3, and if not (No at Step S2), the process is returned to Step S1. In the example illustrated in FIG. 3, the operation determining module 112 determines that the operation is to change into the magnification/reduction mode when the operation based on the operating information is a double-tapping operation and a long-press operation.

Step S3

The operation determining module 112 included in the controller 110 stores the position last touched when the user performed the operation to change into the magnification/reduction mode (a double-tapping operation and a long-press operation) on the operation display surface 131 as the depression point P1 in the storage module 150. The reference-point determining module 113 included in the controller 110 determines which area the position of the depression point P1 belongs to out of the four display areas of the operation display surface 131, and based on the display area to which the depression point P1 belongs, determines the reference point S. When the reference-point determining module 113 determines that the depression point P1 belongs to the third screen area 131c, for example, the reference-point determining module 113 determines the reference point S to be the upper-right end point of the rectangle-shaped operation display surface 131. The process is then moved on to Step S4.

Step S4

The calculating module 114 included in the controller 110 calculates the reference distance L1 that is the distance between the reference point S and the depression point P1, and stores the reference distance L1 in the storage module 150. The process is then moved on to Step S5.

Step S5

When the user performs a touch operation on the operation display surface 131 again, the operating module 120 sends the operating information to the controller 110. The controller 110 detects, by receiving the operating information from the operating module 120, that the operation display surface 131 was depressed. The process is then moved on to Step S6.

Step S6

The operation determining module 112 determines whether or not the operation based on the operating information received is the operation to end the magnification/reduction mode. If the operation is determined to end the magnification/reduction mode (Yes at Step S6), the controller 110 changes the mode from the magnification/reduction mode to the normal mode, and ends the process. Meanwhile, if the operation is determined not to end the magnification/reduction mode (No at Step S6), the process is moved on to Step S7.

Step S7

The operation determining module 112 determines whether or not the operation based on the operating information received is the depression operation performed immediately after the reference distance L1 is calculated by the calculating module 114, and is the operation to determine the depression point P2. If the operating information is determined to be the depression operation performed immediately after the reference distance L1 is calculated by the calculating module 114 and the operation to determine the depression point P2 (Yes at Step S7), the process is moved on to Step S8. If not determined (No at Step S7), the process is returned to Step S5. The operation to determine the depression point P2 here may simply be a depression operation of the user at any position on the operation display surface 131, or a depression-release operation (breakaway operation) after the depression operation.

Step S8

The operation determining module 112 recognizes the position touched by the operation to determine the depression point P2 as the depression point P2. The calculating module 114 calculates the control distance L2 that is the distance between the reference point S and the depression point P2. The calculating module 114 then calculates the magnification ratio M by the above-described Expression (1), and stores the control distance L2 and the magnification ratio M in the storage module 150. The process is then moved on to Step S9.

Step S9

The calculating module 114 calculates the position of the center point C that is the midpoint of a line segment connecting the reference point S and the depression point P1, and stores the position in the storage module 150. Next, the magnification/reduction module 115 included in the controller 110 generates, from the image information of an original image that is displayed on the operation display surface 131, the image information of a scaled image that is the original image magnified or reduced by the magnification ratio M with the center point C as the center. The controller 110 sends the image information that the magnification/reduction module 115 has generated to the display module 130. The display module 130 displays, based on the image information received, the scaled image that is the magnified or reduced original image on the operation display surface 131. The process is then returned to Step S5. More specifically, unless the magnification/reduction mode is ended at Step S6, the control distance L2 and the magnification ratio M are calculated with a new depression point P2 at Steps S8 and S9, permitting the behavior in magnifying or reducing the display image to be repeated.

Figure 10:
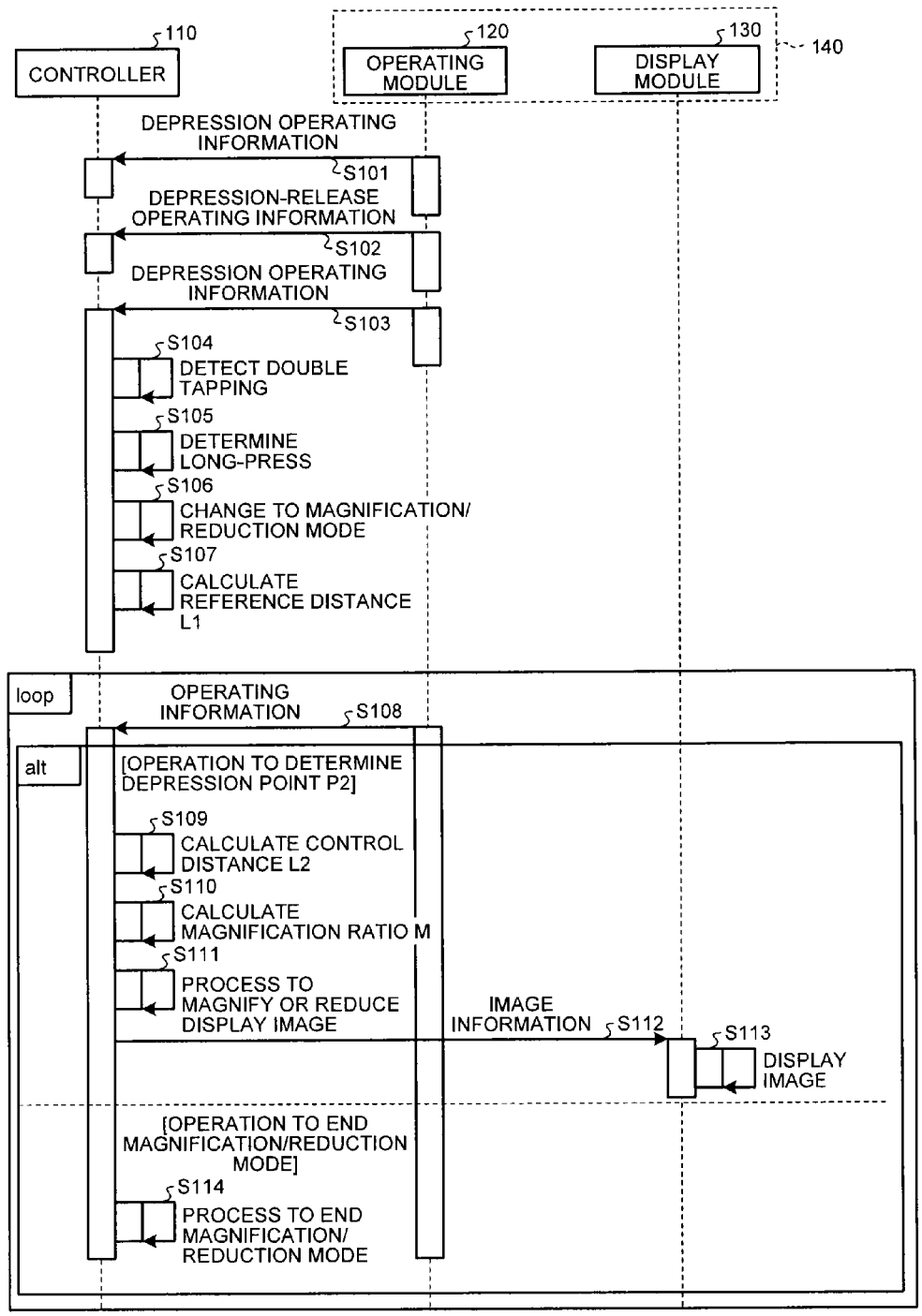
FIG. 10 is a sequence diagram illustrating an example of the behavior of the multifunctional peripheral in the magnification/reduction mode in the first embodiment.

FIG. 10 is a sequence diagram illustrating an example of the behavior of the MFP in the magnification/reduction mode in the first embodiment. With reference to FIG. 10, the behavior of the MFP 100 in the magnification/reduction mode will be described in chronological order with a focus on the flow of information. In the explanation based on FIG. 10, the operation to change into the magnification/reduction mode is assumed to be a double-tapping operation and a long-press operation.

Step S101

When the user performs a depression operation on the operation display surface 131, the operating module 120 sends the information of the depression operation to the controller 110. The operation determining module 112 included in the controller 110 detects, by receiving the information of the depression operation from the operating module 120, that the operation display surface 131 was depressed by the user.

Step S102

When the user breaks away after performing the depression operation on the operation display surface 131 at Step S101, the operating module 120 sends the information of the depression-release operation (breakaway operation) to the controller 110. The operation determining module 112 included in the controller 110 detects, by receiving the information of the depression-release operation from the operating module 120, that the depressed state of the operation display surface 131 was released.

Step S103

When the user performs a depression operation on the operation display surface 131 again, the operating module 120 sends the information of the depression operation to the controller 110.

Step S104

The operation determining module 112 included in the controller 110 detects, by receiving the information of the second depression operation from the operating module 120, that a double-tapping operation was performed on the operation display surface 131 by the user.

Step S105

When the operation determining module 112 included in the controller 110 does not receive the information of depression-release operation for a given period of time (e.g., about 2 seconds) after receiving the information of the second depression operation from the operating module 120, the operation determining module 112 determines that a long-press operation was performed on the operation display surface 131 by the user.

Step S106

The controller 110 changes the mode from the normal mode to the magnification/reduction mode. The mode determining module 111 included in the controller 110 then determines whether the operating mode is changed to the magnification/reduction mode.

Step S107

The operation determining module 112 included in the controller 110 defines the position on the operation display surface 131 at which the second depression operation was performed at Step S104 as the depression point P1. The reference-point determining module 113 included in the controller 110 determines which area the position of the depression point P1 belongs to out of the four display areas of the operation display surface 131, and based on the display area to which the depression point P1 belongs, determines the reference point S. The calculating module 114 included in the controller 110 calculates the reference distance L1 that is the distance between the reference point S and the depression point P1.

Step S108

When the user performs a touch operation on the operation display surface 131 in the magnification/reduction mode, the operating module 120 sends the operating information to the controller 110.

Step S109

When the operation determining module 112 included in the controller 110 determines that the operation based on the operating information received from the operating module 120 is the operation to determine the depression point P2, the operation determining module 112 defines the position touched by the operation as the depression point P2. The calculating module 114 included in the controller 110 calculates the control distance L2 that is the distance between the reference point S and the depression point P2.

Step S110

The calculating module 114 included in the controller 110 calculates the magnification ratio M from the reference distance L1 and the control distance L2 by the above-described Expression (1).

Step S111

The calculating module 114 included in the controller 110 calculates the position of the center point C that is the midpoint of a line segment connecting the reference point S and the depression point P1. The magnification/reduction module 115 included in the controller 110 generates, from the image information of an original image displayed on the operation display surface 131, the image information of a scaled image that is the original image magnified or reduced by the magnification ratio M with the center point C as the center.

Step S112

The controller 110 sends the image information that the magnification/reduction module 115 has generated to the display module 130.

Step S113

The display module 130 displays, based on the image information received from the controller 110, the scaled image that is the magnified or reduced original image on the operation display surface 131.

Step S114

When the operation determining module 112 included in the controller 110 determines that the operation based on the operating information received from the operating module 120 at Step S108 is an operation to end the magnification/reduction mode, the controller 110 changes the mode from the magnification/reduction mode to the normal mode. The mode determining module 111 included in the controller 110 then determines whether or not the operating mode is changed to the normal mode.

As in the foregoing behavior of the information processing apparatus in the magnification/reduction mode in the first embodiment, the display image on the operation display surface 131 can be displayed in a magnified or reduced manner only by the operation performed on the operation display surface 131 with a single pointing tool (the finger 200, a stylus, or the like). This enables the user to magnify or reduce the display image on the operation display surface 131 with one hand, and thus can improve the operability.

Furthermore, the magnification ratio M can be calculated by defining the reference distance L1 and the control distance L2 as appropriate based on the reference point S, and thus the user can magnify or reduce the display image on the operation display surface 131 by a desired magnification.

In the first embodiment, the reference point S is to be determined by sectioning the rectangle-shaped operation display surface 131 into the four screen areas of the same shape, and by determining which area the depression point P1 belongs to. More specifically, when the depression point P1 is determined to belong to the first screen area 131a, the second screen area 131b, the third screen area 131c, or the fourth screen area 131d, the reference point S is defined to be the upper-left end point, the lower-left end point, the upper-right end point, or the lower-right end point of the operation display surface 131, respectively. This permits the display image on the operation display surface 131 to be displayed both in a magnified manner and in a reduced manner.

For example, when the depression point P1 is near the upper-right end point of the third screen area 131c and the reference point S is determined to be the lower-left end point of the second screen area 131b, it is difficult to make the control distance L2, which is the distance between the reference point S and the depression point P2, longer than the reference distance L1. As a result, the display image on the operation display surface 131 can be displayed only in a reduced manner.

Meanwhile, when the depression point P1 is determined to belong to the third screen area 131c and the reference point S is determined to be the upper-right end point of the operation display surface 131, for example, the control distance L2 that is the distance between the reference point S and the depression point P2 can be made not only greater but also smaller than the reference distance L1 as appropriate. More specifically, the magnification ratio M can be made not only greater but also smaller than one, and thus the display image on the operation display surface 131 can be displayed both in a magnified manner and in a reduced manner as appropriate.

The reference point S is not necessarily the upper-left end point, the lower-left end point, the upper-right end point, or the lower-right end point of the operation display surface 131. When the depression point P1 is determined to belong to the third screen area 131c, for example, the reference point S is not necessarily determined to be the upper-right end point of the third screen area 131c and may be determined to be a given position in the third screen area 131c. Even in such a case, the control distance L2 can be made not only greater but also smaller than the reference distance L1 as appropriate, and thus the above-described effect can be yielded.

Second Embodiment

An MFP according to a second embodiment will be described with a focus on the difference in the configuration and behavior of the MFP 100 in the first embodiment.

Overall Configuration of MFP

Figure 11:
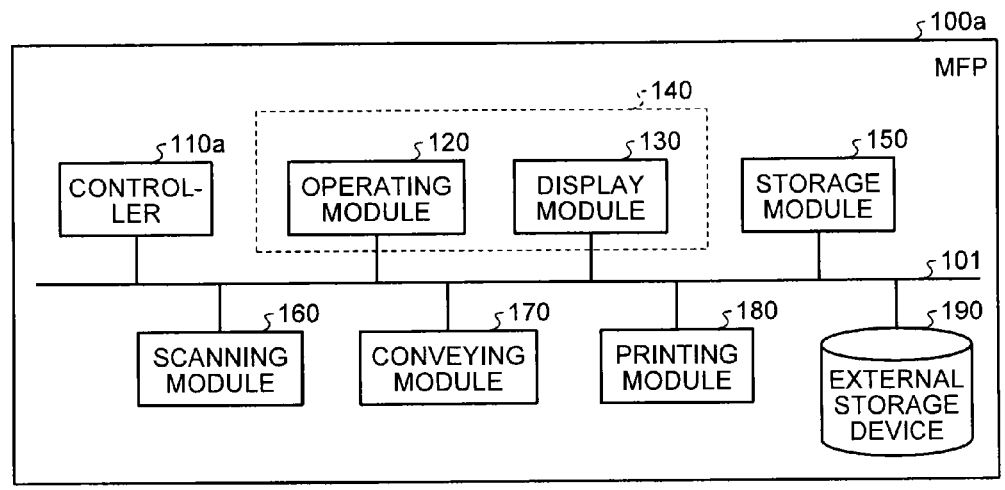
FIG. 11 is a block diagram illustrating an example of the configuration of a multifunction peripheral according to a second embodiment.
Figure 12:
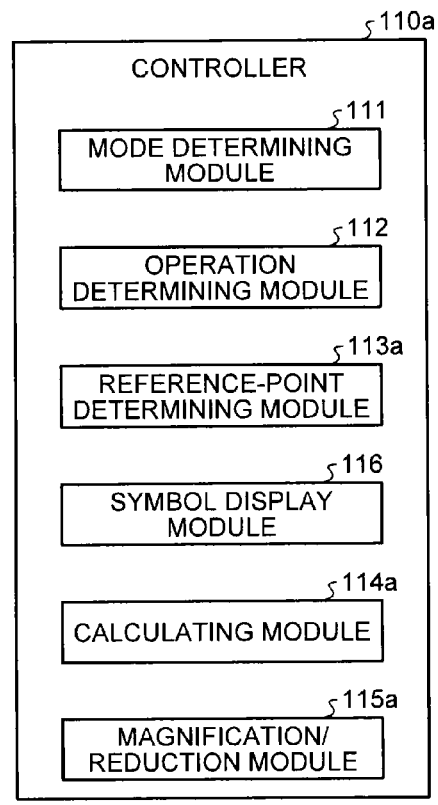
FIG. 12 is a block diagram illustrating an example of the configuration of a controller of the multifunction peripheral in the second embodiment.

FIG. 11 is a block diagram illustrating an example of the configuration of the MFP in the second embodiment. FIG. 12 is a block diagram illustrating an example of the configuration of a controller of the MFP in the second embodiment. With reference to FIGS. 11 and 12, the overall configuration of an MFP 100a in the second embodiment will be described.

As illustrated in FIG. 11, the MFP 100a in the second embodiment includes a controller 110a, the operation display module 140, the storage module 150, the scanning module 160, the conveying module 170, the printing module 180, and the external storage device 190. The foregoing various modules are connected via the bus 101, and are able to send and receive data with one another.

The controller 110a is a device that controls the various modules of the MFP 100a, and is implemented, for example, by a central processing unit (CPU) and an application specific integrated circuit (ASIC).

The operation display module 140 (the operating module 120 and the display module 130), the storage module 150, the scanning module 160, the conveying module 170, the printing module 180, and the external storage device 190 are the same as those in the first embodiment.

As illustrated in FIG. 12, the controller 110a includes the mode determining module 111, the operation determining module 112, a reference-point determining module 113a, a symbol display module 116, a calculating module 114a, and a magnification/reduction module 115a. The mode determining module 111 and the operation determining module 112 are the same as those illustrated in FIG. 1 that is the block diagram of the controller 110 in the first embodiment, and thus the same reference numerals are given and their explanations are omitted here.

The reference-point determining module 113a determines a later described position on the display screen to be a reference (the reference point S) to calculate the reference distance L1, the control distance L2, and the magnification ratio M, as a depression point P11 in the magnification/reduction mode. The control distance L2 is the distance between the reference point S and a later described depression point P13.

The symbol display module 116 displays the position of the reference point S determined by the reference-point determining module 113a as a reference-point mark on the operation display surface 131.

The calculating module 114a calculates the reference distance L1, the control distance L2, and the magnification ratio M based on the reference point S determined by the operation determining module 112 and the depression points performed on the display screen by the user.

The magnification/reduction module 115a performs a process of magnifying or reducing an image displayed on the display screen based on the magnification ratio M calculated by the calculating module 114a, and displays the image, on which the process of magnifying or reducing has been performed, on the display screen.

Figure 13:
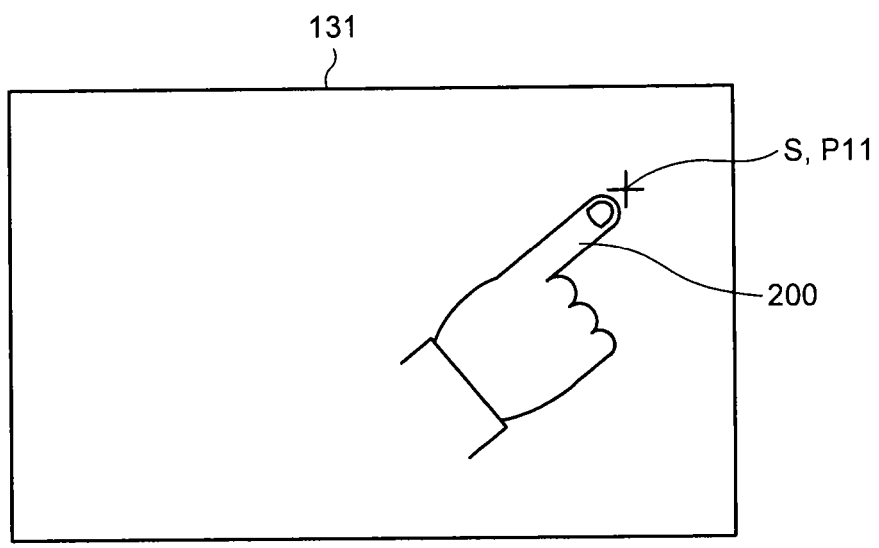
FIG. 13 is a diagram for explaining an example of the behavior in determining a reference point on the display screen in the second embodiment.
Figure 14:
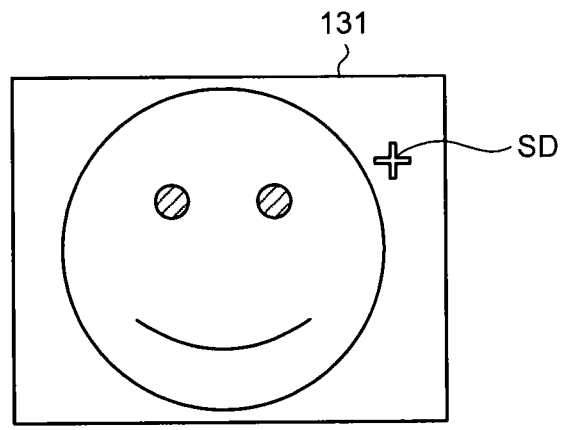
FIG. 14 is a diagram for explaining an example of the behavior in displaying a reference-point mark on the display screen in the second embodiment.
Figure 15:
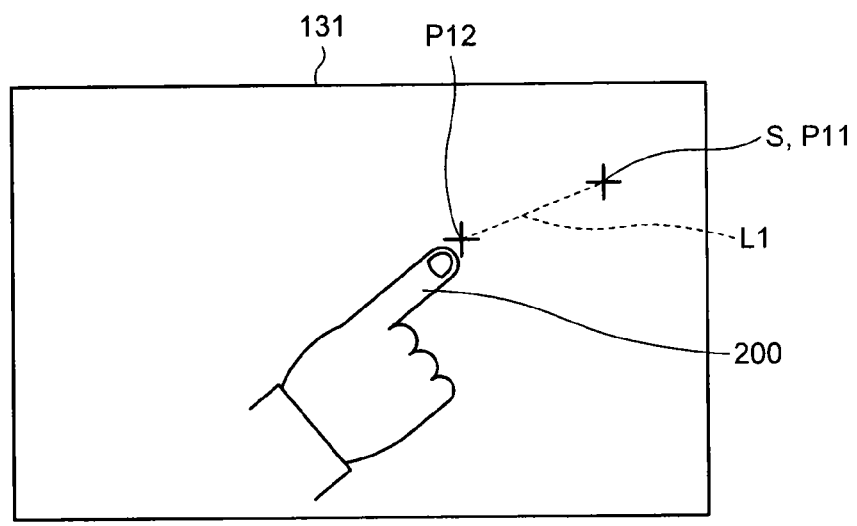
FIG. 15 is a diagram for explaining an example of the behavior in calculating a reference distance on the display screen in the second embodiment.
Figure 16:
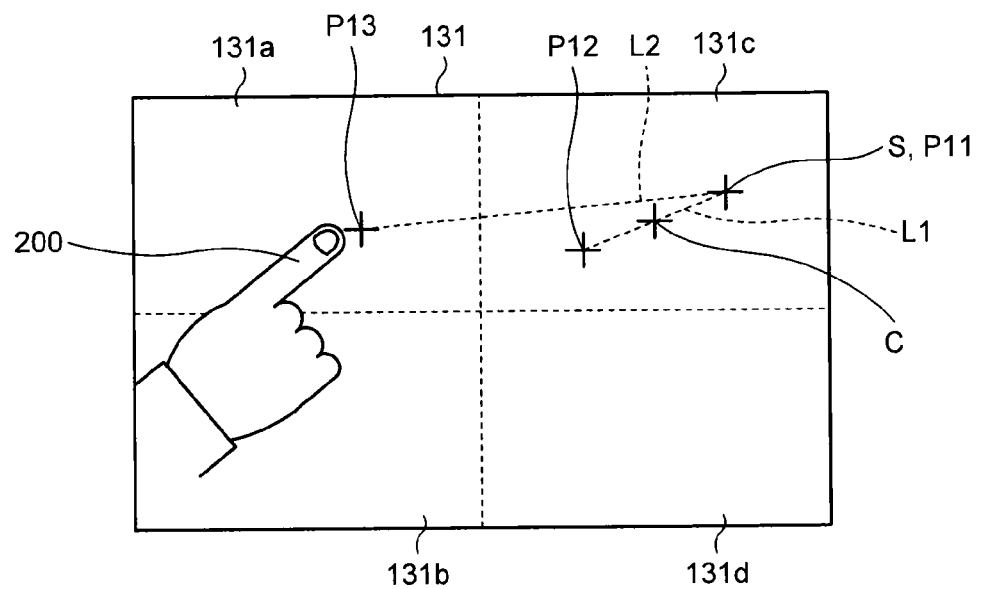
FIG. 16 is a diagram for explaining an example of the behavior in calculating a magnification ratio of a display image on a display screen in the second embodiment.

Behavior in Calculating Reference Point, Reference Distance, and Magnification Ratio FIG. 13 is a diagram for explaining an example of the behavior in determining a reference point on the display screen in the second embodiment. FIG. 14 is a diagram for explaining an example of the behavior in displaying a reference-point mark on the display screen in the second embodiment. FIG. 15 is a diagram for explaining an example of the behavior in calculating a reference distance on the display screen in the second embodiment. FIG. 16 is a diagram for explaining an example of the behavior in calculating a magnification ratio of a display image on the display screen in the second embodiment. With reference to FIGS. 11 to 16, the behavior in calculating the reference point S, the reference distance L1, and the magnification ratio M by the controller 110a will be described. In FIGS. 15 and 16, for the convenience of explanation, the display of a later described reference-point mark SD is omitted.

The operation determining module 112 included in the controller 110a stores the position last touched when the user performed a double-tapping operation and a long-press operation on the operation display surface 131 to change the operating mode to the magnification mode as the depression point P11 in the storage module 150.

Next, as illustrated in FIG. 13, the reference-point determining module 113a included in the controller 110a determines the reference point S to be the depression point P11. The symbol display module 116 included in the controller 110a then displays the reference-point mark SD at the position of the reference point S on the operation display surface 131, as illustrated in FIG. 14, so that the user can recognize the position of the reference point S. While the reference-point mark SD is cross-shaped as illustrated in FIG. 14, it is not limited to this and it may be in another shape such as a round shape, a star shape, and a rectangle. Furthermore, the behavior in displaying the reference-point mark SD on the operation display surface 131 can be applied to the MFP 100 in the first embodiment.

Next, as illustrated in FIG. 15, the user performs a depression operation at any position on the operation display surface 131. The operating module 120 sends the operating information representing the depression operation to the controller 110a. The operation determining module 112 included in the controller 110a determines that the content of operation represented by the operating information is the depression operation performed immediately after that the reference point S is determined by the reference-point determining module 113a. The operation determining module 112 then stores the position touched by the depression operation in the storage module 150 as a depression point P12.

The calculating module 114a included in the controller 110a then calculates the reference distance L1 that is the distance between the reference point S (depression point P11) and the depression point P12 as illustrated in FIG. 15, and stores the reference distance L1 in the storage module 150.

Next, as illustrated in FIG. 16, the user performs a depression operation at any position on the operation display surface 131. The operating module 120 sends the operating information representing the depression operation to the controller 110a. The operation determining module 112 determines that the content of operation represented by the operating information is the depression operation performed immediately after that the reference distance L1 is calculated by the calculating module 114a. The operation determining module 112 then recognizes the position touched by the depression operation as the depression point P13.

The calculating module 114a calculates the control distance L2 that is the distance between the reference point S and the depression point P13. The calculating module 114a then calculates the magnification ratio M by the above-described Expression (1), and stores the control distance L2 and the magnification ratio M in the storage module 150.

While the calculating module 114a calculates the control distance L2 after calculating the reference distance L1 following the reference point S being determined by the reference-point determining module 113a as in the foregoing, it is not limited to this. More specifically, the calculating module 114a may calculate the reference distance L1 based on the depression point P12 defined by the user operation after calculating the control distance L2 based on the depression point P13 defined by the user operation.

Behavior in Magnifying or Reducing Display Image

The behavior in magnifying or reducing a display image on the operation display surface 131 in the second embodiment is basically the same as that described with reference to FIG. 7(a) to 8(b) in the first embodiment. Thus, in the following description, the behavior in magnifying or reducing a display image on the operation display surface 131 in the second embodiment will be explained briefly, and the points of difference will be explained.

The relation of the reference distance L1 and the control distance L2 calculated by the calculating module 114a is assumed to be Reference distance L1>Control distance L2. Consequently, the magnification ratio M calculated by the calculating module 114a is a value greater than zero but less than one. The calculating module 114a further calculates the position of the center point C that is the midpoint of a line segment connecting the reference point S and the depression point P12 as illustrated in FIG. 16, and stores the position in the storage module 150.

Next, the magnification/reduction module 115a generates, from the image information of an original image that is a display image on the operation display surface 131, image information that is the original image magnified or reduced by the magnification ratio M with the center point C as the center. The magnification ratio M calculated by the calculating module 114a is assumed to be a value greater than zero but less than one as in the foregoing, and thus the display image on the operation display surface 131 is reduced. The controller 110a sends, to the display module 130 the image information generated and a command to erase the reference-point mark SD displayed on the operation display surface 131. The display module 130 displays a scaled image that is the reduced original image on the operation display surface 131 based on the image information received from the magnification/reduction module 115a, and erases the reference-point mark SD. Meanwhile, when the magnification ratio M calculated by the calculating module 114a is a value greater than one, the display image on the operation display surface 131 is magnified.

Behavior of MFP in Magnification/Reduction Mode

Figure 17:
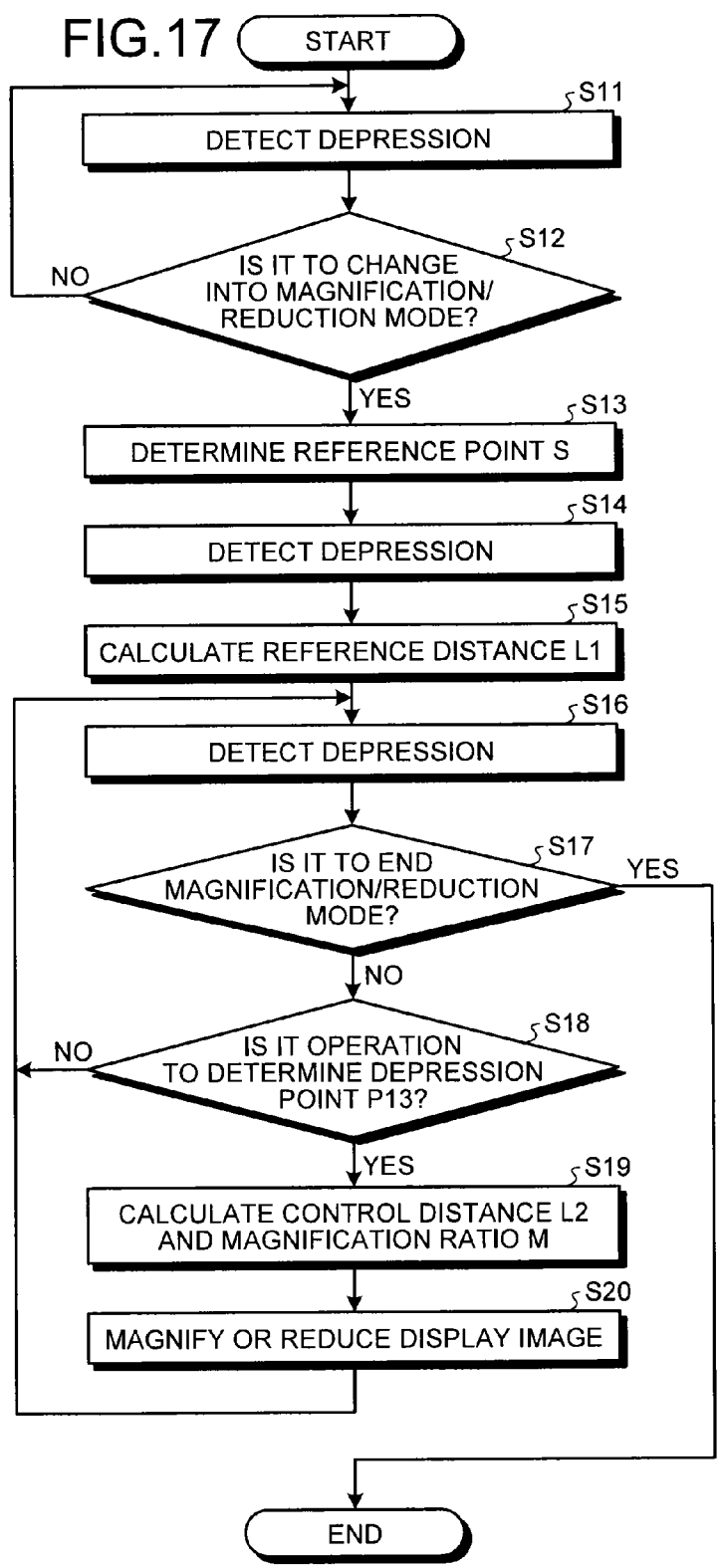
FIG. 17 is a flowchart illustrating an example of the behavior of the multifunctional peripheral in the magnification/reduction mode in the second embodiment.

FIG. 17 is a flowchart illustrating an example of the behavior of the MFP in the magnification/reduction mode in the second embodiment. With reference to FIG. 17, an outline of the behavior of the MFP 100a in the magnification/reduction mode will be described.

Step S11

When the user performs a touch operation on the operation display surface 131, the operating module 120 sends the operating information to the controller 110a. The controller 110a detects, by receiving the operating information from the operating module 120, that the operation display surface 131 was depressed by the user. The process is then moved on to Step S12.

Step S12

The operation determining module 112 included in the controller 110a determines whether or not the operation based on the operating information received is the operation to change into the magnification/reduction mode. If the operation is determined to change into the magnification/reduction mode, the controller 110a changes the mode from the normal mode to the magnification/reduction mode. The mode determining module 111 included in the controller 110a then determines whether or not the operating mode is changed to the magnification/reduction mode. If the operating mode is determined to be in the magnification/reduction mode (Yes at Step S12), the process is moved on to Step S13, and if not (No at Step S12), the process is returned to Step S11. Specifically, when the operation based on the operating information is a double-tapping operation and a long-press operation, the operation determining module 112 determines that the operation is to change into the magnification/reduction mode.

Step S13

The operation determining module 112 included in the controller 110a stores, in the storage module 150, the position last touched when the user performed the operation to change into the magnification/reduction mode (a double-tapping operation and a long-press operation) on the operation display surface 131 as the depression point P11. The reference-point determining module 113a included in the controller 110a determines the reference point S to be the depression point P11. The symbol display module 116 included in the controller 110a displays the reference-point mark SD at the position of the reference point S on the operation display surface 131 so that the user can recognize the position of the reference point S. The process is then moved on to Step S14.

Step S14

When the user performs a depression operation at any position on the operation display surface 131, the operating module 120 sends the operating information to the controller 110a. The operation determining module 112 determines that the content of operation represented by the operating information is the depression operation performed immediately after that the reference point S is determined by the reference-point determining module 113a. The operation determining module 112 stores the position touched by the depression operation as the depression point P12 in the storage module 150. The process is then moved on to Step S15.

Step S15

The calculating module 114a included in the controller 110a calculates the reference distance L1 that is the distance between the reference point S and the depression point P12, and stores the reference distance L1 in the storage module 150. The process is then moved on to Step S16.

Step S16

When the user performs a touch operation on the operation display surface 131 again, the operating module 120 sends the operating information to the controller 110a. The controller 110a detects, by receiving the operating information from the operating module 120, that the operation display surface 131 was depressed. The process is then moved on to Step S17.

Step S17

The operation determining module 112 determines whether or not the operation based on the operating information received is the operation to end the magnification/reduction mode. If the operation is determined to end the magnification/reduction mode (Yes at Step S17), the controller 110a changes the mode from the magnification/reduction mode to the normal mode, and ends the process. Meanwhile, if the operation is determined not to end the magnification/reduction mode (No at Step S17), the process is moved on to Step S18.

Step S18

The operation determining module 112 determines whether or not the operation based on the operating information received is the depression operation performed immediately after that the reference distance L1 is calculated by the calculating module 114a, and is the operation to determine the depression point P13. If the operating information is determined to be the depression operation performed immediately after that the reference distance L1 is calculated by the calculating module 114a and the operation to determine the depression point P13 (Yes at Step S18), the process is moved on to Step S19. If not determined (No at Step S18), the process is returned to Step S16. The operation to determine the depression point P13 here may simply be a depression operation of the user at any position on the operation display surface 131, or a depression-release operation (breakaway operation) after the depression operation.

Step S19

The operation determining module 112 recognizes the position touched by the operation to determine the depression point P13 as the depression point P13. The calculating module 114a calculates the control distance L2 that is the distance between the reference point S and the depression point P13. The calculating module 114a then calculates the magnification ratio M by the above-described Expression (1), and stores the control distance L2 and the magnification ratio M in the storage module 150. The process is then moved on to Step S20.

Step S20

The calculating module 114a calculates the position of the center point C that is the midpoint of a line segment connecting the reference point S and the depression point P12, and stores the position in the storage module 150. Next, the magnification/reduction module 115a included in the controller 110a generates, from the image information of an original image that is displayed on the operation display surface 131, the image information of a scaled image that is the original image magnified or reduced by the magnification ratio M with the center point C as the center. The controller 110a sends, to the display module 130, the image information generated by the magnification/reduction module 115a and a command to erase the reference-point mark SD displayed on the operation display surface 131. The display module 130 displays the scaled image that is the magnified or reduced original image on the operation display surface 131 based on the image information received, and erases the reference-point mark SD. The process is then returned to Step S16. More specifically, unless the magnification/reduction mode is ended at Step S17, the control distance L2 and the magnification ratio M are calculated with a new depression point P13 at Steps S19 and S20, permitting the behavior in magnifying or reducing the display image to be repeated.

Figure 18:
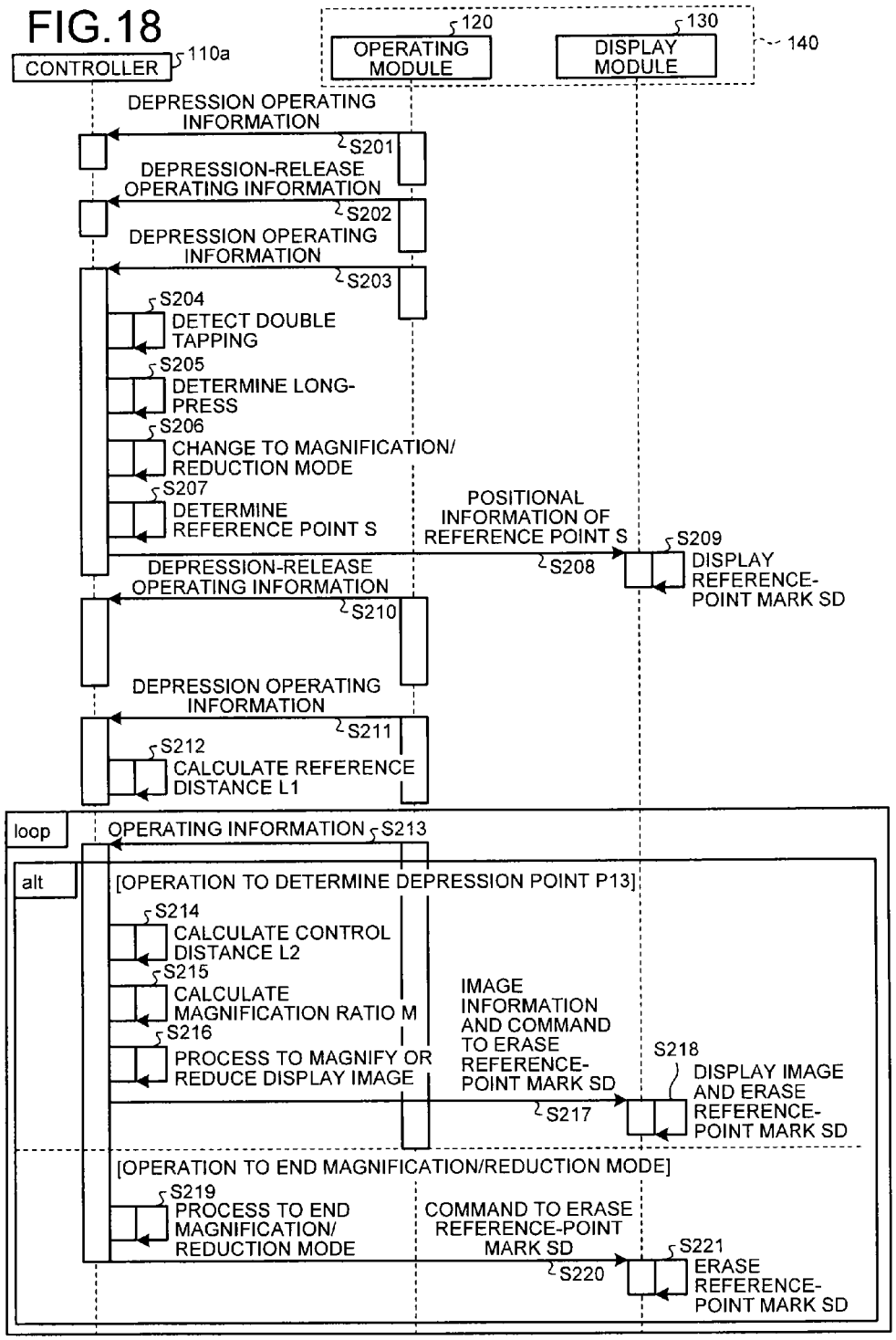
FIG. 18 is a sequence diagram illustrating an example of the behavior of the multifunctional peripheral in the magnification/reduction mode in the second embodiment.

FIG. 18 is a diagram for explaining an example of behavior in displaying a reference point, a depression point, and a reference line on the display screen in the second embodiment. With reference to FIG. 18, the behavior of the MFP 100a in the magnification/reduction mode will be described in chronological order with a focus on the flow of information. In the explanation based on FIG. 18, the operation to change into the magnification/reduction mode is assumed to be a double-tapping operation and a long-press operation.

Step S201

When the user performs a depression operation on the operation display surface 131, the operating module 120 sends the information of the depression operation to the controller 110a. The operation determining module 112 included in the controller 110a detects, by receiving the information of the depression operation from the operating module 120, that the operation display surface 131 was depressed by the user.

Step S202

When the user breaks away after performing the depression operation on the operation display surface 131 at Step S201, the operating module 120 sends the information of the depression-release operation (breakaway operation) to the controller 110a. The operation determining module 112 included in the controller 110a detects, by receiving the information of the depression-release operation from the operating module 120, that the depressed state of the operation display surface 131 was released.

Step S203

When the user performs a depression operation on the operation display surface 131 again, the operating module 120 sends the information of the depression operation to the controller 110a.

Step S204

The operation determining module 112 included in the controller 110a detects, by receiving the information of the second depression operation from the operating module 120, that a double-tapping operation was performed on the operation display surface 131 by the user.

Step S205

When the operation determining module 112 included in the controller 110a does not receive the information of depression-release operation for a given period of time (e.g., about 2 seconds) after receiving the information of the second depression operation from the operating module 120, the operation determining module 112 determines that a long-press operation was performed on the operation display surface 131 by the user.

Step S206

The controller 110a changes the mode from the normal mode to the magnification/reduction mode. The mode determining module 111 included in the controller 110a then determines whether the operating mode is changed to the magnification/reduction mode.

Step S207

The operation determining module 112 included in the controller 110a defines the position on the operation display surface 131 at which the second depression operation was performed at Step S204 as the depression point P11. The reference-point determining module 113a included in the controller 110a determines the reference point S to be the depression point P11.

Step S208

The symbol display module 116 included in the controller 110a sends the positional information of the reference point S on the operation display surface 131 to the display module 130.

Step S209

The display module 130 displays the reference-point mark SD at the position of the reference point S on the operation display surface 131 based on the positional information of the reference point S received from the controller 110a.

Step S210

When the user breaks away after performing the long-press operation on the operation display surface 131 at Step S205, the operating module 120 sends the information of the depression-release operation (breakaway operation) to the controller 110a. The operation determining module 112 included in the controller 110a detects, by receiving the information of the depression-release operation from the operating module 120, that the long-press state of the operation display surface 131 was released.

Step S211

When the user performs a depression operation on the operation display surface 131, the operating module 120 sends the information of the depression operation to the controller 110a. The operation determining module 112 included in the controller 110a detects, by receiving the information of the depression operation from the operating module 120, that the operation display surface 131 was depressed by the user immediately after that the reference point S was determined by the reference-point determining module 113a.

Step S212

The operation determining module 112 included in the controller 110a defines the position on the operation display surface 131 at which the depression operation was performed at Step S211 as the depression point P12. The calculating module 114a included in the controller 110a calculates the reference distance L1 that is the distance between the reference point S and the depression point P12.

Step S213

When the user performs a touch operation on the operation display surface 131 in the magnification/reduction mode, the operating module 120 sends the operating information to the controller 110a.

Step S214

When the operation determining module 112 included in the controller 110a determines that the operation based on the operating information received from the operating module 120 is the operation to determine the depression point P13, the operation determining module 112 defines the position touched by the operation as the depression point P13. The calculating module 114a included in the controller 110a calculates the control distance L2 that is the distance between the reference point S and the depression point P13.

Step S215

The calculating module 114a included in the controller 110a calculates the magnification ratio M from the reference distance L1 and the control distance L2 by the above-described Expression (1).

Step S216

The calculating module 114a included in the controller 110a calculates the position of the center point C that is the midpoint of a line segment connecting the reference point S and the depression point P12. The magnification/reduction module 115a included in the controller 110a generates, from the image information of an original image displayed on the operation display surface 131, the image information of a scaled image that is the original image magnified or reduced by the magnification ratio M with the center point C as the center.

Step S217

The controller 110a sends, to the display module 130, the image information generated by the magnification/reduction module 115a and a command to erase the reference-point mark SD displayed on the operation display surface 131.

Step S218

The display module 130 displays the scaled image that is the magnified or reduced original image on the operation display surface 131 based on the image information received from the controller 110a, and erases the reference-point mark SD.

Step S219

When the operation determining module 112 included in the controller 110a determines that the operation based on the operating information received from the operating module 120 at Step S213 is the operation to end the magnification/reduction mode, the controller 110a changes the mode from the magnification/reduction mode to the normal mode. The mode determining module 111 included in the controller 110a then determines whether the operating mode is changed to the normal mode.

Step S220

The controller 110a sends a command to erase the reference-point mark SD displayed on the operation display surface 131 to the display module 130.

Step S221 The display module 130 erases the reference-point mark SD.

As in the foregoing behavior of the information processing apparatus in the magnification/reduction mode in the second embodiment, the display image on the operation display surface 131 can be displayed in a magnified or reduced manner only by the operation performed on the operation display surface 131 with a single pointing tool (the finger 200, a stylus, or the like). This enables the user to magnify or reduce the display image on the operation display surface 131 with one hand, and thus can improve the operability.

Furthermore, the magnification ratio M can be calculated by defining the reference distance L1 and the control distance L2 as appropriate based on the reference point S, and thus the user can magnify or reduce the display image on the operation display surface 131 by a desired magnification.

Moreover, the reference point S can be defined at any position on the operation display surface 131 by the operation to change into the magnification/reduction mode. This makes it easier for the user to instinctively set the reference distance L1, which is based on the reference point S, and the magnification ratio M in the neighborhood of desired values, and thus can improve the operability. Furthermore, the user can define the reference point S (the depression point P11) and the depression point P12 at any position on the operation display surface 131, and thus the user is able to define the position of the center point C, which is the midpoint of the line segment connecting the reference point S and the depression point P12, at a desired position. This enables the user to define the center point for the magnification or reduction of the display image on the operation display surface 131 at a desired position, and thus can improve the operability.

In the second embodiment, as illustrated in FIG. 14, the reference point S defined is displayed as the reference-point mark SD on the operation display surface 131. Consequently, the operability of the user in setting the reference distance L1 based on the reference point S and the magnification ratio M, and the operability of the user in setting the position of the center point C can be further improved.

Modification

Figure 19:
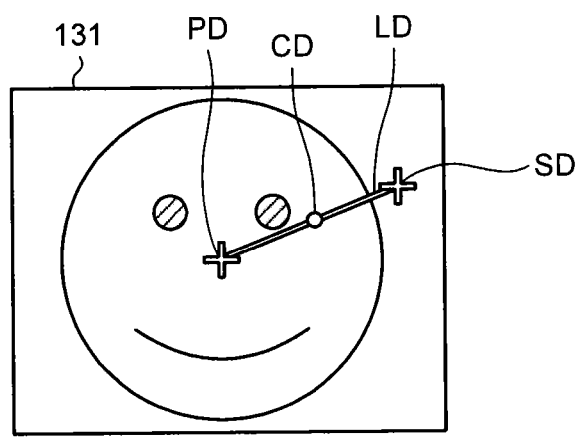
FIG. 19 is a diagram for explaining an example of the behavior in displaying a reference point, a depression point, a center point, and a reference line on a display screen according to a modification of the second embodiment.

FIG. 19 is a diagram for explaining an example of the behavior in displaying a reference point, a depression point, a center point, and a reference line on a display screen according to a modification of the second embodiment. With reference to FIG. 19, the behavior in displaying the reference point S, a depression point, a center point, and a reference line on the display screen in the modification of the second embodiment will be described.

In FIG. 14, the display module 130 is exemplified to display the reference-point mark SD at the position of the reference point S determined by the reference-point determining module 113a on the operation display surface 131. Not only displaying the reference-point mark SD at the position of the reference point S in this manner, the display module 130 may, as illustrated in FIG. 19, display a depression-point mark PD at the position of the depression point P12 and display a center-point mark CD at the position of the center point C. Furthermore, the display module 130 may, as illustrated in FIG. 19, display a line segment connecting the reference point S and the depression point P12 as a reference line LD.

As in the foregoing, the depression-point mark PD and the reference line LD being displayed on the operation display surface 131 makes it further easier for the user to define the magnification ratio M, which is based on the reference distance L1 and the control distance L2, in the neighborhood of a desired value, and thus can improve the operability. While all of the reference-point mark SD, the reference line LD, and the depression-point mark PD are displayed on the operation display surface 131 as illustrated in FIG. 19, it is not limited to this. For example, even displaying only the reference-point mark SD and the depression-point mark PD or displaying only the reference line LD enables the user to recognize the reference distance L1, and thus can yield the above-described effect.

Furthermore, the center-point mark CD being displayed on the operation display surface 131 enables the user to accurately grasp the position being the center for magnifying or reducing the display image, and thus can improve the operability.

The behavior in displaying at least one of the depression-point mark PD, the center-point mark CD, and the reference line LD on the operation display surface 131 can be applied to the MFP 100 in the first embodiment.

The hardware configuration of the information processing apparatuses in the respective embodiments in the foregoing will be described. The information processing apparatuses in the embodiments can be implemented by the hardware configuration including a control device such as a CPU, a storage device such as a ROM and a RAM, an external storage device such as an HDD or an SSD, a display device such as a display or a touch panel which includes at least a touch panel, an input device such as a mouse and keyboard or a touch panel which includes at least a touch panel, and a communication device such as a network interface card (NIC).

The programs executed in the information processing apparatuses in the respective embodiments are stored and provided in a computer readable storage medium such as a compact disc read only memory (CD-ROM), a compact disc recordable (CD-R), a memory card, a digital versatile disc (DVD), and a flexible disk (FD), as an installable or executable file.

The programs executed in the information processing apparatuses in the respective embodiments may be stored in a computer connected to a network such as the Internet and provided being downloaded via the network. Furthermore, the programs executed in the information processing apparatuses in the respective embodiments may be provided or distributed via a network such as the Internet. The programs executed in the information processing apparatuses in the respective embodiments may be embedded and provided in a ROM, for example.

The programs executed in the information processing apparatuses in the respective embodiments are modularly configured to implement the various modules (the mode determining module 111, the operation determining module 112, the reference-point determining module 113, 113a, the calculating module 114, 114a, the magnification/reduction module 115, 115a, and the symbol display module 116) on the information processing apparatuses. As for the actual hardware, the control device reads out the program from the external storage device and executes it on the storage device, whereby the various modules are implemented on the information processing apparatus.

The embodiments of the present invention has an effect of improving operability in magnifying and reducing a display image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
an operating module to which a touch operation performed with a pointing tool is entered;
a calculating module that calculates a reference distance that is a distance between a reference point on an image display area of an operation display surface and a point on the image display area defined by a first operation performed on the operating module with the pointing tool, calculates a control distance that is a distance between the reference point and a point on the image display area defined by a second operation performed on the operating module with the pointing tool, and calculates a magnification ratio based on the reference distance and the control distance; and
a magnification/reduction module that generates a scaled image by magnifying or reducing a display image displayed on the image display area by the magnification ratio.

2. The information processing apparatus according to claim 1, further comprising:
a reference-point determining module that determines the reference point on the image display area, wherein
the image display area is in a rectangular shape,
the first operation is an operation to change into a magnification/reduction mode, and
the reference-point determining module determines an end point closest to a point defined by the first operation as the reference point out of end points at four corners of the image display area.

3. The information processing apparatus according to claim 1, further comprising:
a reference-point determining module that determines the reference point on the image display area, wherein
the reference-point determining module determines a point on the image display area defined by an operation to change into a magnification/reduction mode as the reference point.

4. The information processing apparatus according to claim 1, wherein the calculating module calculates, as the magnification ratio, a value obtained by dividing the control distance by the reference distance.

5. The information processing apparatus according to claim 1, wherein
the calculating module calculates a position of a midpoint of a line segment connecting the reference point and a point defined by the first operation, and
the magnification/reduction module generates the scaled image by magnifying or reducing the display image by the magnification ratio with the midpoint as center.

6. The information processing apparatus according to claim 5, further comprising a symbol display module that displays a position of the midpoint on the image display area.

7. The information processing apparatus according to claim 1, further comprising a symbol display module that displays at least one of the reference point and a line segment connecting the reference point and a point defined by the first operation on the image display area.

8. The information processing apparatus according to claim 1, wherein the image display area is an area of a part of the operation display surface.

9. An information processing method comprising:
determining a reference point on an image display area of an operation display surface;
calculating a reference distance that is a distance between the reference point and a point on the image display area defined by a first operation performed on an operating module to which a touch operation performed with a pointing tool is entered with the pointing tool;
calculating a control distance that is a distance between the reference point and a point on the image display area defined by a second operation performed with a single piece of the pointing tool;
calculating a magnification ratio based on the reference distance and the control distance; and
displaying a scaled image that is a display image displayed on the image display area magnified or reduced by the magnification ratio.

10. A non-transitory computer-readable recording medium that contains a computer program that causes a computer to function as:
a reference-point determining module that determines a reference point on an image display area of an operation display surface;
a calculating module that calculates a reference distance that is a distance between the reference point and a point on the image display area defined by a first operation performed on an operating module to which a touch operation performed with a pointing tool is entered with a single piece of the pointing tool, calculates a control distance that is a distance between the reference point and a point on the image display area defined by a second operation performed with a single piece of the pointing tool, and calculates a magnification ratio based on the reference distance and the control distance; and
a magnification/reduction module that displays a scaled image that is a display image displayed on the image display area magnified or reduced by the magnification ratio.

* * * * *